United States Patent [19]

Iwata et al.

[11] Patent Number: 5,324,526
[45] Date of Patent: Jun. 28, 1994

[54] ALGIN-CONTAINING FOOD AND BEVERAGE

[75] Inventors: Kazuyuki Iwata, Eniwa; Kazuhiro Watanabe, Eniwa; Yoshiyuki Kimura, Kyoto; Hiromichi Okuda, Matsuyama, all of Japan

[73] Assignee: Sumitomo Metal Industries, Ltd., Osaka, Japan

[21] Appl. No.: 144,392

[22] Filed: Nov. 2, 1993

Related U.S. Application Data

[62] Division of Ser. No. 813,920, Dec. 27, 1991, Pat. No. 5,283,076.

[30] Foreign Application Priority Data

Dec. 28, 1990 [JP] Japan ................. 2-416688
Aug. 1, 1991 [JP] Japan ................. 3-193270

[51] Int. Cl.$^5$ .......................................... A23L 1/0532
[52] U.S. Cl. .................................. 426/2; 426/575; 426/804; 426/590; 424/78.01; 514/779; 514/866; 514/911
[58] Field of Search .................. 426/2, 573, 575, 804, 426/590; 424/78.01; 514/779, 911, 866

[56] References Cited

U.S. PATENT DOCUMENTS

| | | | |
|---|---|---|---|
| 1,913,576 | 6/1933 | Walsh | 426/575 |
| 2,000,807 | 5/1935 | Wig | 426/575 |
| 2,653,106 | 9/1953 | Bonniksen | 426/575 |
| 2,859,115 | 11/1958 | Rivoche | 426/575 |
| 2,930,701 | 3/1960 | Merton et al. | 426/575 |
| 2,935,409 | 5/1960 | McDowell | 426/575 |
| 3,455,701 | 7/1969 | Miller et al. | 426/575 |
| 4,089,981 | 5/1978 | Richardson | 426/575 |
| 4,623,539 | 11/1986 | Tunc | 424/78.01 |
| 4,853,245 | 8/1989 | Bouilette | 426/575 |

FOREIGN PATENT DOCUMENTS 55-28956 of 1980 Japan.
1-240175 of 1989 Japan.

OTHER PUBLICATIONS

Hackh's Chemical Dictionary, McGraw Hill Inc. N.Y. 1969 p. 25.

Primary Examiner—Jeanette Hunter
Attorney, Agent, or Firm—Burns, Doane, Swecker & Mathis

[57] ABSTRACT

An algin-containing food or beverage comprises a low-molecular weight algin which has a weight-average molecular weight in the range of 10,000–900,000 and still functions as a dietary fiber and has beneficial effects on the health. The algin can be prepared by subjecting a high-molecular weight naturally occurring algin or its derivative to heat treatment at a temperature of 100°–200° C. under pressure.

4 Claims, 3 Drawing Sheets

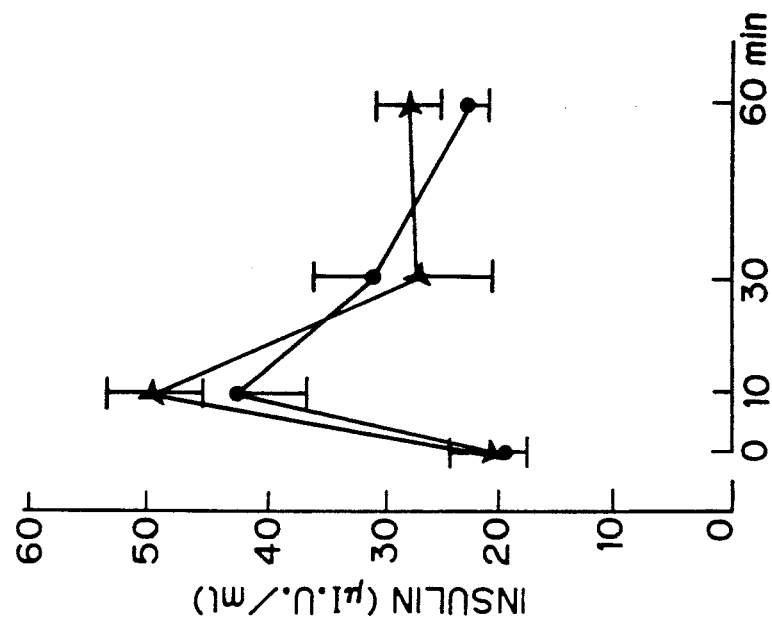
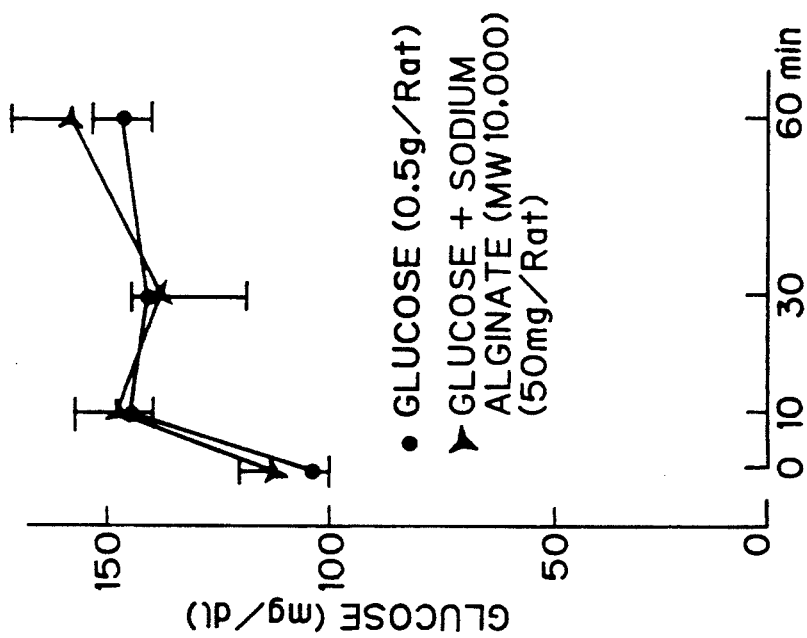

ALGIN-CONTAINING FOOD AND BEVERAGE

This application is a divisional of application Ser. No. 07/813,920, filed Dec. 27, 1991 now U.S. Pat. No. 5,283,076.

BACKGROUND OF THE INVENTION

The present invention relates to functional foods and beverages containing an algin such as alginic acid or an alginate salt or ester which functions as dietary fibers. More particularly, the invention relates to algin-containing health foods and especially beverages, in which the algin has a decreased molecular weight while still retaining its functions as a dietary fiber. Such algin-containing foods have a preventive effect on obesity and diabetes.

Alginic acid is a high molecular weight, polyuronide-type polysaccharide which comprises D-mannuronic acid (abbreviated as M) and L-guluronic acid (abbreviated as G) combined in a varying proportion. It is present between cells of brown algae. The molar ratio of M to G (M/G ratio) of alginic acid varies depending on the species of the alga, season, and location in the algal body.

Alginic acid is made by extracting brown algae such as giant kelp (*Macrocystis pyrifera*) with an aqueous sodium carbonate solution followed by precipitation with hydrochloric acid or calcium chloride. Free alginic acid is very slightly soluble in water and tends to gel therein. Therefore, in practical use, a water-soluble salt of alginic acid, e.g., an alginate salt with an alkali metal such as sodium is used in the form of an aqueous solution. An aqueous solution of a water-soluble alginate salt is extremely viscous and finds many applications, including as sizing agents, food additives, and paint thickeners.

The term "algin" used herein encompasses alginic acid and its derivatives including alginate salts and esters.

Algin is known to have many desirable effects on human health. When an alginate salt is ingested, it is converted into free alginic acid by a reaction with the acid in the stomach and gelled. The gelled alginic acid cannot be absorbed by humans since mammals have no enzymes capable of digesting alginic acid. Therefore, algin functions as a dietary fiber and is effective in intestinal regulation and prevention of constipation. Sodium alginate is reported to be effective, when administered, in accelerating the excretion of cholesterol and depressing the biological absorption of harmful metals such as strontium and cadmium. An aqueous 5% solution of sodium alginate is clinically used as a drug in treatment of peptic ulcers and esophagitis. Potassium and calcium alginates are reported to have a sodium-excreting activity[see, the Japanese journal "Shokuhin Kaihatsu (Food Development)", Vol. 20, No. 3, pp. 20–23 (1985)].

In Japan, alginic acid, sodium alginate, and alginic acid propylene glycol ester are approved as food additives, while in many European countries and the U.S.A., potassium alginate, ammonium alginate, and calcium alginate are also approved. Thus, many species of algin have been proved to be harmless to the human body.

On the basis of these advantageous effects of algin on health, a health beverage containing alginic acid or sodium alginate has been proposed in Japanese Patent Application Laid-Open (Kokai) No. 55-28956( 1980 ). Japanese Patent Application Laid-Open (Kokai) No. 1-240175(1989) discloses a high-fiber content beverage which comprises water-insoluble dietary fibers dispersed in an aqueous dispersion medium containing a gelling agent and a thickener. It is described therein that alginic acid and its derivatives can be used as a gelling agent. This laid-open application teaches that algin can be merely used as a gelling agent to thicken the beverage without the use of its function as a dietary fiber.

When an alginate salt such as sodium alginate is added to a beverage, it is not possible to increase its content beyond a few percent, because a higher content causes the resulting solution to have an extremely high viscosity which makes the solution no longer suitable for drinking. Therefore, an alginate salt can be used only in the form of a dilute solution having a concentration of a few percent or lower even in beverages as health foods. However, an algin-containing beverage having such a low content cannot achieve the desirable effects of algin.

SUMMARY OF THE INVENTION

It is an object of the present invention to provide an algin-containing food, and particularly a health food in the form of a beverage, which has a relatively high algin content and which can achieve the beneficial effects of algin on health, and particularly its effects as a dietary fiber.

Another object of the invention is to provide a method for preparing such an algin-containing food.

As described above, a natural algin obtained by extraction of brown algae has a high molecular weight, which is responsible for its relatively low solubility in water and the high viscosity of the resulting solution. The present inventors attempted to decrease the molecular weight of a natural algin in order to increase its water solubility and decrease the viscosity of the resulting solution.

It is known in the prior art that the molecular weight of a natural algin can be decreased by acid hydrolysis or biodegradation with the aid of an enzyme. Acid hydrolysis involves an additional neutralization step when the resulting lower molecular weight alginic acid is recovered. Biodegradation requires a long time for the completion of degradation. Furthermore, both methods give an algin product having an extremely low weight-average molecular weight on the order of less than 10,000. It cannot be expected that such a product still retains the desired functions of algin as a dietary fiber.

It has been found that heat treatment of a natural algin under pressure results in a decrease in weight-average molecular weight in a controlled manner to a range of from 10,000 to 900,000, in which the desirable effects of algin as a dietary fiber are still maintained. It has also been found that the resulting algin having a decreased molecular weight is not only useful as a dietary fiber but is also effective for prevention of obesity and diabetes.

The present invention provides an algin-containing food which comprises an algin having a weight-average molecular weight in the range of 10,000–900,000.

The present invention also provides an algin-containing beverage for use as a health food which comprises from 1% to 50% by weight of a water-soluble algin having a weight-average molecular weight in the range of 10,000–900,000.

Such a low-molecular weight algin can be obtained from a high-molecular weight naturally-occurring alginic acid or its derivative by heat treatment at 100°-200° C. under pressure.

BRIEF DESCRIPTION OF THE DRAWINGS

FIGS. 1(a) and 1(b) are graphs showing the effects of sodium alginate having an average molecular weight of 10,000 on the levels of plasma glucose and insulin, respectively, upon glucose loading;

DESCRIPTION OF THE INVENTION

Figure 2B:
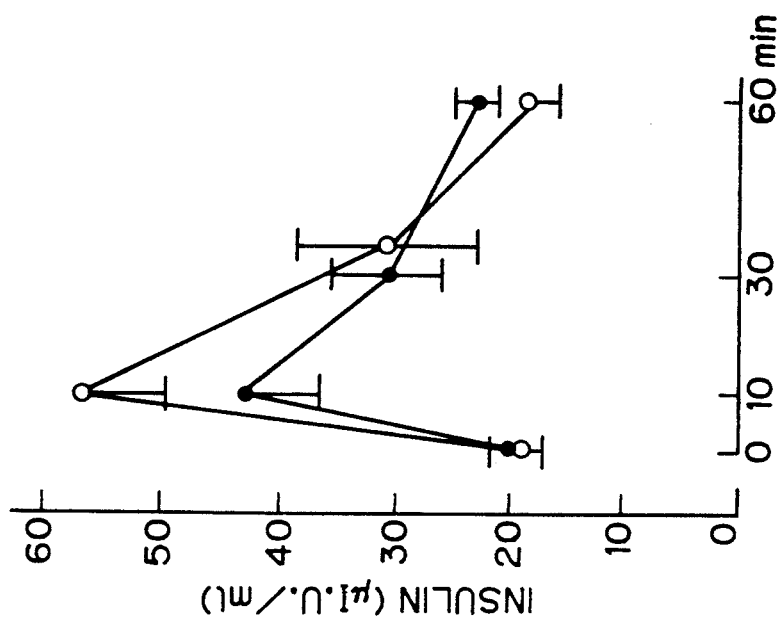
FIGS. 2(a) and 2(b) are graphs showing the effects of sodium alginate having an average molecular weight of 50,000 on the levels of plasma glucose and insulin, respectively, upon glucose loading.

The algin useful in the invention has a weight-average molecular weight (hereinafter merely referred to as average molecular weight) in the range of 10,000–900,000, which is much lower than that of a conventionally used naturally-occurring alginic acid or its derivative. Such an algin can be prepared by subjecting a naturally-occurring alginic acid or its derivative to heat treatment at a temperature of 100°-100° C. under pressure for a time sufficient to decrease the molecular weight to 10,000–900,000 by thermal degradation, although any algin can be used provided that it has an average molecular weight in the above range. For the ease of drinking, the algin preferably has an average molecular weight of 10,000–150,000 and more preferably 50,000–100,000.

Theoretically, the algin may be any alginic acid or alginate salt which includes ammonium, alkali metal (e.g., sodium and potassium), alkaline earth metal (e.g., magnesium and calcium), and other metal (e.g., iron and tin) salts or alginate ester such as propylene glycol ester. However, since it is added to a beverage, it must be selected from those algins which are approved as food additives. Therefore, useful algins are limited, at present, to alginic acid and sodium, potassium, ammonium, and calcium salts and propylene glycol ester of alginic acid.

In order to obtain the algin useful in the present invention, a naturally-occurring algin which is a high-molecular weight alginic acid or its derivative (alginate salt or ester) should be degraded to decrease the average molecular weight to 10,000–900,000. The starting algin may be obtained from brown algae by extraction in the method known in the art or it may be a commercially-available product. Those alginate salts or esters which are not approved as food additives may also be used as a starting algin.

The degradation of the starting algin can be performed by subjecting the algin, preferably in the form of an aqueous solution, to heat treatment at a temperature of 100°-200° C. under pressure. At a temperature below 100° C. the desired degradation does not proceed at a satisfactory rate, while at a temperature above 200° C. degradation proceeds excessively, resulting in the formation of an algin product having an average molecular weight of less than 10,000, which loses its effects as a dietary fiber.

According to the book "Kaiso Kogyo (Alga Industry)", by Takeo Takahashi, published by Kogyo Tosho, Japan, p. 235 (1941), alginic acid is subjected to heat treatment under pressure for the structural analysis thereof. In the description in that book, the heat treatment was performed to obtain almost completely degraded products of alginic acid which are useful for structural analysis and it was not intended to obtain a low-molecular weight algin product which still retains its functions as a dietary fiber. Furthermore, there is no description on the conditions for heat treatment.

The concentration of the aqueous solution to be treated is not critical and is usually in the range of 0.1%–50% by weight. The pressure applied during heat treatment is preferably in the range of 0.1-15 kg/cm²-gauge. A suitable pressure reactor such as a high-temperature, high-pressure reactor or a conventional autoclave may be used to conduct the heat treatment depending on the pressure. The reactor may be of the continuous, semi-continuous, or batch type and it may be either agitated or not agitated. The reaction is continued until the starting algin is degraded to the desired average molecular weight. The reaction time varies depending on the temperature, pressure, concentration, and other reaction conditions and is generally in the range of from 1 minute to 100 hours.

If necessary, the resulting low-molecular weight algin is converted into free alginic acid or an alginate salt or ester which is approved as a food additive. The conversion can be performed by hydrolysis, ion-exchange, neutralization, esterification, transesterification, or the like in a conventional manner. The resulting aqueous solution may be concentrated or it may be converted into a powder by a suitable technique such as concentration, freeze-drying, or spray drying.

Compared to the starting natural algin, the low-molecular algin product prepared in the above manner and having an average molecular weight of 10,000–900,000 has a significantly increased solubility in water, and the resulting aqueous solution has a significantly decreased viscosity at the same concentration. Still it is effective as a dietary fiber. Therefore, it makes it possible to prepare a health food beverage having an increased algin content. In contrast, with the starting natural algin, only a beverage having an algin content of at most a few percent can be prepared and such a content may be insufficient to achieve the desirable effects of algin.

The algin-containing food or beverage according to the present invention has an algin content in the range of from 1% to 50% by weight. The algin content may be selected depending on the particular algin and its molecular weight. The lower the molecular weight of the algin, the higher the maximum algin content which can be used. In general, an algin content of less than 1% is not sufficient to be effective as a dietary fiber, while an algin content of more than 50% causes the resulting aqueous solution to have an extremely high viscosity, making the solution no longer suitable for drinking. Preferably the algin content is about 5%–20% by weight and more preferably about 5%–10% by weight.

An algin-containing food can be prepared by adding the low-molecular weight algin in the form of either a powder or an aqueous solution to an appropriate food. An algin-containing beverage can be prepared either by dissolving the low-molecular weight algin in powder form in water or another drinkable liquid such as fruit juice or by adjusting the concentration of the aqueous solution obtained by the above-described heat treatment, if necessary.

If desired, the algin-containing food or beverage may further contain one or more food additives which include sweeteners, flavors, preservatives, and coloring agents. In order to enhance the functions of the beverage as a health food, one or more additives selected from other dietary fibers and various health-promoting substances, e.g., iodine, iron-containing substance, fructo-oligosaccharide, and *Lactobacillus bifidus* may be added to the beverage.

The algin-containing beverage contains an algin having a molecular weight which is high enough to retain its effect as a dietary fiber and low enough to reduce the viscosity for ease of drinking, and it has a high algin content sufficient to promote the health. Therefore, when drunk, the beverage can exert the above-described favorable effects of algin on the health. Since an algin cannot be digested and hence is noncaloric, an excess intake of an algin will not adversely affect the health to an appreciable degree.

The low molecular weight algin of the present invention is also useful in the prevention of obesity and diabetes, particularly when it has an average molecular weight of 50,000 to 900,000. It has been proven that such an algin suppresses an increase in blood glucose and insulin levels caused by glucose loading. It is believed that this effect is the result of suppressing the absorption of glucose through the intestine or increasing the metabolism and clearance of glucose in the peripheral tissues.

Therefore, the algin-containing food according to the present invention can effectively suppress an abnormal increase in blood glucose and insulin levels caused by excessive intake of carbohydrates and sugars derived from food. Thus, it is effective in reducing the activity of insulin to synthesize neutral fats from glucose, thereby preventing obesity and diabetes. Suppression of an increase in blood glucose level is also effective for prevention of aggravation of diabetes or prevention of obesity and hyperlipemia.

When the algin-containing food is used as a functional food for these purposes, it may be not only in the form of a beverage as described above, but also in other forms such as a powder or jelly.

The number of patients suffering from diabetes accompanied by hyperlipemia or obesity is increasing in Japan due to the change of diet toward a high fat diet from a high carbohydrate diet and due to an increase in the intake of sugar. In the treatment of hyperlipemia and diabetes, a considerable number of medicines have been developed and clinically used. In addition, functional or health foods such as dietary fiber-containing beverages which are claimed to be effective for prevention of these diseases are sold on the market. However, these foods rely upon the inhibition of cholesterol or triglyceride synthesis or cholesterol absorption and result in a decrease in fat level.

In contrast, the low-molecular weight algin used in the present invention also affects the metabolism of glucose. Therefore, it will be more effective for prevention of obesity and diabetes and prevent obesity and aggravation of diabetes caused by excessive intake of glucose.

The following preparations, experiments, and examples are presented to further illustrate the present invention. It should be understood, however, that the invention is not limited to the specific details set forth in the examples.

Preparation of Low-Molecular Weight Algin

Preparations 1-7

Commercially available sodium alginate (5 g) manufactured from giant kelp (*Macrocystis pyrifera*) and 95 g of water were mixed thoroughly and placed in an autoclave. The mixture was heat-treated in the autoclave under the conditions (temperature and period) shown in Table 1 to thermally degrade the algin under pressure. The pressure inside the autoclave was the autogenous pressure at the temperature used. For example, the pressure was about 0.1 kg/cm$^2$-gauge at 100° C. and about 2 kg/cm$^2$-gauge at 130° C. At the end of the heat treatment, samples of the resulting aqueous solution containing a thermally-degraded low molecular weight algin product were used to determine the weight-average molecular weight of the algin product by GPC (gel permeation chromatography) and the viscosity of the solution at 30° C. by a rotational viscometer.

Preparation 8

Following the procedure used for the preceding preparations, 10 g of sodium alginate and 90 g of water were subjected to thermal degradation under the same conditions as employed for Preparation 6.

Control

For comparison, the average molecular weight of the untreated sodium alginate used for the preceding preparations and the solution viscosity thereof were determined using the starting mixture used for Preparations 1 to 7.

The results obtained in these preparations and the control are also shown in Table 1.

TABLE 1

| Results of Heat Treatment of Sodium Alginate | | | | |
|---|---|---|---|---|
| Preparation No. | Temperature (°C.) | Period (min) | Average MW | Viscosity (cP) |
| 1 | 130 | 60 | 220,000 | 108 |
| 2 | 120 | 60 | 900,000 | 975 |
| 3 | 110 | 60 | 1,400,000 | 8,000 |
| 4 | 100 | 60 | 1,800,000 | 14,800 |
| 5 | 130 | 90 | 140,000 | 30.5* |
| 6 | 130 | 120 | 60,000 | 13* |
| 7 | 130 | 250 | 10,000 | 1.5* |
| 8 | 130 | 120 | 70,000 | 4.2** |
| Control | (Untreated) | | 2,700,000 | 26,500 |

(Note)
Viscosity was generally measured in an aqueous solution at a concentration of 5.2–5.3% at 30° C.
*measured at 20° C.;
**measured at a concentration of 10.7% at 30° C.

The results of Table 1 demonstrate that sodium alginate having a molecular weight of 2,700,000 can be degraded to form a low-molecular weight product having a molecular weight in the range of 10,000–1,800,000 by heat treatment under pressure. The higher the treatment temperature and the longer the treating period, the lower the molecular weight of the product. Accordingly, it is apparent that the average molecular weight of an algin can be lowered to a desired value in the range of 10,000–900,000 which is suitable for beverages by appropriately selecting the conditions for heat treatment. The molecular weight range of the degraded product was relatively narrow. Furthermore, the algin solutions obtained in Preparations 1, 2, and 5 to 8 which had an average molecular weight of not greater than 900,000 in accordance with the present invention had as low a viscosity as 1,000 cP or less. In contrast, the algin solutions obtained in Preparations 3 and 4 which contained an algin having a molecular weight of 1,400,000 or 1,800,000 had much higher viscosities of 8,000 cP and 14,800 cP, respectively, and were too viscous for drinking.

Effect of Low-Molecular Weight Algin on Intestinal Absorption of Harmful Substances The following experiments were performed to illustrate that a low molecular weight algin obtained in the above manner has an effect of suppressing the intestinal absorption of harmful substances to a degree comparable to that of a conventional high molecular weight algin.

Test Procedure

Male Wistar rats aged 8 weeks were used as test animals. Each test animal was given a radioactive harmful substance in a predetermined dose, and immediately thereafter an aqueous solution of sodium alginate was orally administered at a dose of 1.0 ml/100 g-body weight. To the animals in a control group, vehicle was administered in place of the sodium alginate solution. After the administration, urine and feces of each animal were taken at regular intervals and the radioactivity thereof was measured to determine the cumulative radioactivity expressed as a percent based on the radioactivity of the substance administered. The % cumulative radioactivity was used as an indication for evaluating the effectiveness of the algin in suppression of absorption of the harmful substance through the digestive tract. The harmful substances used were cholesterol, trp-P-1 which is a carcinogen, and aflatoxin $B_1$ which is a fungal toxin.

Experiment 1

An aqueous 1% solution of a low-molecular weight sodium alginate (abbreviated as AG-10, average molecular weight: 100,000) and an aqueous 1% solution of an untreated sodium alginate (abbreviated as AG-270, average molecular weight: 2,700,000) were orally administered immediately after the administration of radioactive cholesterol and the % cumulative radioactivity in feces were determined to evaluate the effect of the algin on absorption of cholesterol.

The results are shown in Table 2, from which it can be seen that the low molecular weight sodium alginate significantly suppressed the absorption of cholesterol after 24 hours and its suppressive effect was comparable to that of the untreated sodium alginate.

Experiment 2

The effect of the low-molecular weight and untreated sodium alginate on the intestinal absorption of trp-P-1 was evaluated in the same manner as described in Experiment 1 except that radioactive trp-P-1 was used as a harmful substance.

The results are shown in Table 3, from which it can be seen that the low molecular weight sodium alginate significantly suppressed the absorption of trp-P-1 after 24 hours and its suppressive effect was comparable to that of the untreated sodium alginate.

Experiment 3

The effect of the low-molecular weight and untreated sodium alginate on the intestinal absorption of aflatoxin $B_1$ was evaluated in the same manner as described in Experiment 1 except that radioactive aflatoxin $B_1$ was used as a harmful substance.

The results are shown in Table 4, from which it can be seen that the low molecular weight sodium alginate significantly suppressed the absorption of aflatoxin $B_1$ after 24 hours and its suppressive effect was comparable to that of the untreated sodium alginate.

Experiment 4

Using aqueous 10% solutions of low molecular weight sodium alginates (AG-1, AG-5, and AG-10; average molecular weight: 10,000, 50,000, and 100,000, respectively) and an untreated sodium alginate (AG-270), the effects of these sodium alginates on intestinal absorption of cholesterol were evaluated in the same manner as described in Experiment 1.

The results are shown in Table 5, from which it can be seen that the low molecular sodium alginate having an average molecular weight of 50,000 and that having an average molecular weight of 100,000 significantly suppressed the absorption of cholesterol.

Experiment 5

The effect of a low-molecular weight sodium alginate and untreated sodium alginate on the intestinal absorption of trp-P-1 was evaluated in the same manner as described in Experiment 5 except that radioactive trp-P-1 was used as a harmful substance and the radioactivity was measured of both urine and feces.

The results are shown in Table 6 in terms of the % cumulative radioactivity of urine and feces. The cumulative radioactivity of feces indicates that all the low molecular weight sodium alginates significantly suppressed the absorption of trp-P-1 after 24 hours and that AG-5 was particularly effective. In contrast with the results for feces, the cumulative radioactivity of urine in the administered groups was lower than that of the control group. Thus, it was confirmed that these algins had an effect of suppressing the intestinal absorption of trp-P-1.

Experiment 6

The effect of a low-molecular weight sodium alginate and untreated sodium alginate on the intestinal absorption of aflatoxin $B_1$ was evaluated in the same manner as described in Experiment 5 except that radioactive aflatoxin $B_1$ was used as a harmful substance.

The results are shown in Table 7. The cumulative radioactivity of feces indicates that the low molecular weight sodium alginates having an average molecular weight of 50,000 and 100,000 (AG-5 and AG-10) significantly suppressed the absorption of aflatoxin $B_1$ after 24 hours. In contrast with the results for feces, the cumulative radioactivity of urine in the administered groups was lower than that of the control group. Thus, it was confirmed that these algins had an effect of suppressing the intestinal absorption of aflatoxin $B_1$.

TABLE 2

| | Effect on Intestinal Absorption of Cholesterol | | |
|---|---|---|---|
| Time | % Cumulative Radioactivity[1)] | | |
| (hr) | Control | AG-270 | AG-10 |
| 0–24 | 16.3 ± 1.1 | 20.5 ± 1.7* | 17.1 ± 1.0 |
| –48 | 24.1 ± 0.9 | 31.9 ± 2.4* | 29.2 ± 0.9* |
| –72 | 30.9 ± 1.6 | 37.3 ± 2.2* | 35.4 ± 0.5* |

TABLE 2-continued

Effect on Intestinal Absorption of Cholesterol

| Time | % Cumulative Radioactivity[1] | | |
|---|---|---|---|
| (hr) | Control | AG-270 | AG-10 |
| −96 | 35.5 ± 1.8 | 41.9 ± 2.0* | 40.7 ± 0.7* |

[1]Based on radioactivity administered; the figures are mean value ± standard error, n = 5;
AG-270: Untreated sodium alginate (MW = 2,700,000);
AG-10: Low-molecular weight sodium alginate (MW = 100,000);
*Significance of difference (P<0.05) between control and administered groups as determined with Student's t-test.

TABLE 3

Effect on Intestinal Absorption of Trp-P-1

| Time | % Cumulative Radioactivity[1] | | |
|---|---|---|---|
| (hr) | Control | AG-270 | AG-10 |
| 0–24 | 22.2 ± 4.8 | 30.9 ± 2.3 | 29.5 ± 0.1 |
| −48 | 32.2 ± 1.6 | 36.5 ± 1.7 | 35.0 ± 0.9 |
| −72 | 33.6 ± 1.0 | 37.0 ± 1.6 | 36.1 ± 1.0 |
| −96 | 33.9 ± 1.1 | 37.5 ± 1.7 | 36.4 ± 0.9 |

[1]Based on radioactivity administered; the figures are mean value ± standard error, n = 4-5

TABLE 4

Effect on Intestinal Absorption of Aflatoxin B₁

| Time | % Cumulative Radioactivity[1] | | |
|---|---|---|---|
| (hr) | Control | AG-270 | AG-10 |
| 0–24 | 20.7 ± 2.2 | 25.9 ± 4.7 | 20.7 ± 1.1 |
| −48 | 26.2 ± 1.9 | 29.3 ± 3.7 | 30.9 ± 1.5 |
| −72 | 31.4 ± 0.4 | 32.6 ± 3.1 | 33.3 ± 1.0 |
| −96 | 31.9 ± 0.5 | 33.3 ± 3.1 | 33.7 ± 1.8 |

[1]Based on radioactivity administered; the figures are mean value ± standard error, n = 3-5

TABLE 5

Effect on Intestinal Absorption of Cholesterol

| Time | % Cumulative Radioactivity[1] | | | |
|---|---|---|---|---|
| (hr) | Control | AG-1 | AG-5 | AG-10 |
| 0–24 | 15.5 ± 1.2 | 12.1 ± 2.1 | 21.5 ± 2.0* | 24.8 ± 1.3** |
| −48 | 24.1 ± 0.7 | 24.6 ± 2.9 | 33.8 ± 1.3** | 34.2 ± 0.6** |
| −72 | 31.2 ± 1.4 | 30.7 ± 2.7 | 38.6 ± 1.1** | 40.2 ± 0.7** |
| −96 | 36.1 ± 0.8 | 35.8 ± 2.4 | 43.8 ± 2.4** | 45.9 ± 0.5** |

[1]Based on radioactivity administered; the figures are mean value ± standard error, n = 3–6;
AG-1: Low-molecular weight sodium alginate (MW = 10,000);
AG-5: Low-molecular weight sodium alginate (MW = 50,000);
AG-10: Low-molecular weight sodium alginate (MW = 100,000);
*, **: Significance of difference between control and administered groups as determined with Student's t-test: * = P<0.05, ** = P<0.01

TABLE 6

Effect on Intestinal Absorption of Trp-P-1

| Time | | % Cumulative Radioactivity[1] | | | |
|---|---|---|---|---|---|
| (hr) | | Control | AG-1 | AG-5 | AG-10 |
| 0–24 | feces | 23.0 ± 3.8 | 28.2 ± 1.1 | 38.7 ± 3.7* | 32.2 ± 1.6 |
| | urine | 18.1 ± 1.0 | 16.3 ± 0.5 | 15.5 ± 0.4 | 16.2 ± 0.5 |
| −48 | feces | 32.9 ± 1.5 | 36.4 ± 0.2* | 44.0 ± 3.4** | 38.6 ± 0.3* |
| | urine | 20.6 ± 1.1 | 18.7 ± 0.6 | 17.6 ± 0.4* | 18.7 ± 0.6 |
| −72 | feces | 34.1 ± 1.0 | 37.1 ± 0.3* | 44.4 ± 3.4** | 39.4 ± 0.9** |
| | urine | 22.2 ± 1.2 | 20.1 ± 0.6 | 19.2 ± 0.3 | 20.2 ± 0.7 |
| −96 | faces | 34.5 ± 1.0 | 37.4 ± 0.2* | 45.6 ± 3.3** | 40.1 ± 0.3** |
| | urine | 23.4 ± 1.2 | 21.0 ± 0.6 | 20.1 ± 0.3* | 21.2 ± 0.8 |

[1]Based on radioactivity administered; the figures are mean value ± standard error, n = 3–5;
*, **: Significance of difference between control and administered groups as determined with Student's t-test: * = P<0.05, ** = P<0.01

TABLE 7

Effect on Intestinal Absorption of Aflatoxin B₁

| Time | | % Cumulative Radioactivity[1] | | | |
|---|---|---|---|---|---|
| (hr) | | Control | AG-1 | AG-5 | AG-10 |
| 0–24 | feces | 21.0 ± 2.5 | 19.3 ± 1.3 | 22.4 ± 4.9 | 25.5 ± 1.8 |
| | urine | 14.2 ± 1.8 | 13.3 ± 0.5 | 13.7 ± 1.3 | 13.0 ± 1.1 |
| −48 | feces | 26.6 ± 2.3 | 29.9 ± 1.2 | 34.7 ± 0.9* | 32.4 ± 0.8* |
| | urine | 22.0 ± 2.8 | 20.2 ± 0.8 | 19.0 ± 1.1 | 18.5 ± 0.7 |
| −72 | feces | 31.5 ± 0.5 | 32.8 ± 1.0 | 36.5 ± 1.1** | 34.6 ± 0.6** |
| | urine | 27.6 ± 3.2 | 24.0 ± 1.6 | 22.3 ± 2.7 | 22.2 ± 0.7 |
| −96 | faces | 32.0 ± 0.5 | 33.8 ± 1.8 | 37.1 ± 0.7** | 35.3 ± 0.6** |
| | urine | 30.8 ± 3.6 | 26.2 ± 1.0 | 24.3 ± 3.0 | 24.3 ± 1.2 |

[1]Based on radioactivity administered; the figures are mean value ± standard error, n = 3–5;
*, **: Significance of difference between control and administered groups as determined with Student's t-test: * = P<0.05, ** = P<0.01

Effect of Low-Molecular Weight Algin on Increase in Plasma Glucose and Insulin Levels in a Glucose Tolerance Test

Experiment 7

Male Wistar rats having a body weight of 200–250 g (5–15 animals in each group) were simultaneously orally administered 0.5 g per rat of glucose and 50 mg (1 ml as an aqueous 5% solution) per rat of a low-molecular weight sodium alginate prepared as above using an oral sound. The animals in a control group received glucose alone. In this experiment, sodium alginates having an average molecular weight of 10,000, 50,000, and 100,000 (AG-1, AG-5, and AG-10) were used. Immediately and 10, 30, and 60 minutes after the administration, blood samples were collected by aparalytic cardiopuncture and were centrifuged to separate the plasma. The plasma samples were assayed to determine the glucose and insulin levels using Glucose B-Test assay kit (Wako-Junyaku Kogyo) and EIA INSULIN TEST-S assay kit (Medicine and Biology Laboratories), respectively. The results are summarized in Tables 8 and 9 and shown as graphs in FIGS. 1(a), 1(b), 2(a), 2(b), 3(a), and 3(b).

ments of body weight and pathoanatomical observations, if necessary.

TABLE 8

Effect on Plasma Glucose Level in Glucose Tolerance

| Group | Blood glucose level (mg/dl) [Mean Value ± SE] | | | |
|---|---|---|---|---|
| | 0 min | 10 min | 30 min | 60 min |
| Control (n = 15) | 103.8 ± 3.84 | 145.3 ± 5.07 | 140.5 ± 4.61 | 147.2 ± 7.24 |
| + AG-1 (50 mg, n = 5) | 110.2 ± 11.4 | 146.0 ± 10.86 | 138.2 ± 20.34 | 157.9 ± 14.57 |
| + AG-5 (50 mg, n = 5) | 110.3 ± 5.52 | 137.8 ± 7.86 | 111.1 ± 6.02* | 88.3 ± 9.01** |
| + AG-10 (50 mg, n = 5) | 106.8 ± 4.50 | 147.6 ± 6.69 | 114.8 ± 9.66* | 134.6 ± 10.15 |

AG-1: Low-molecular weight sodium alginate (MW = 10,000);
AG-5: Low-molecular weight sodium alginate (MW = 50,000);
AG-10: Low-molecular weight sodium alginate (MW = 100,000);
*, **: Significance of difference between control and administered groups as determined with Student's t-test: * = P<0.05, ** = P<0.01

TABLE 9

Effect on Plasma Insulin Level in Glucose Tolerance

| Group | Blood insulin level (μIU/ml) [Mean Value ± SE] | | | |
|---|---|---|---|---|
| | 0 min | 10 min | 30 min | 60 min |
| Control (n = 15) | 19.6 ± 1.91 | 43.1 ± 6.77 | 31.1 ± 5.19 | 22.8 ± 2.34 |
| + AG-1 (50 mg, n = 5) | 20.2 ± 4.02 | 49.3 ± 3.95 | 27.2 ± 6.33 | 28.2 ± 3.17 |
| + AG-5 (50 mg, n = 5) | 18.9 ± 2.18 | 57.7 ± 8.82 | 30.9 ± 7.99 | 18.4 ± 3.46 |
| + AG-10 (50 mg, n = 5) | 19.1 ± 3.40 | 38.2 ± 9.82 | 19.4 ± 2.43* | 23.7 ± 2.54 |

*Significance of difference between control and administered groups as determined with Student's t-test: * = P<0.05

Figure 2A:
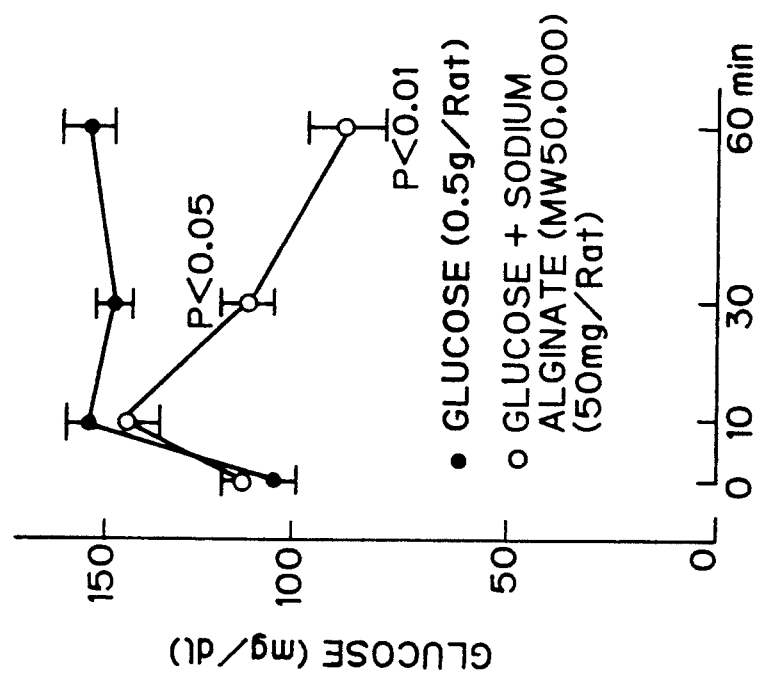

Sodium alginate having an average molecular weight of 50,000 (AG-5) significantly prevented the blood glucose level from rising 30 and 60 minutes after the glucose loading or administration (P<0.05 and P<0.01, respectively) as shown in FIG. 2(a), but it had no effect on the blood insulin level as shown in FIG. 2(b). These results indicate that the algin, AG-5, not only may prevent the absorption of glucose through the small intestine but also may promote the utilization of glucose in the peripheral tissues such as muscles.

Figure 3A:
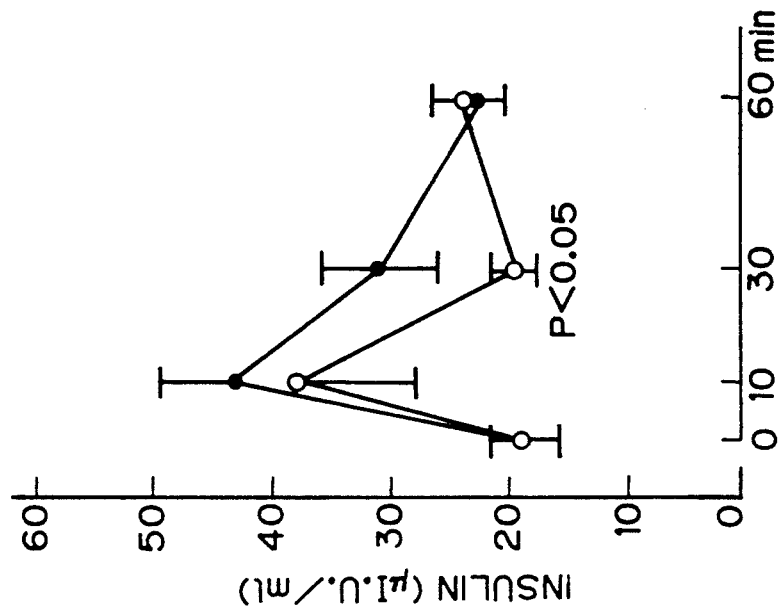
FIGS. 3(a) and 3(b) are graphs showing the effects of sodium alginate having an average molecular weight of 100,000 on the levels of plasma glucose and insulin, respectively, upon glucose loading.
Figure 3B:
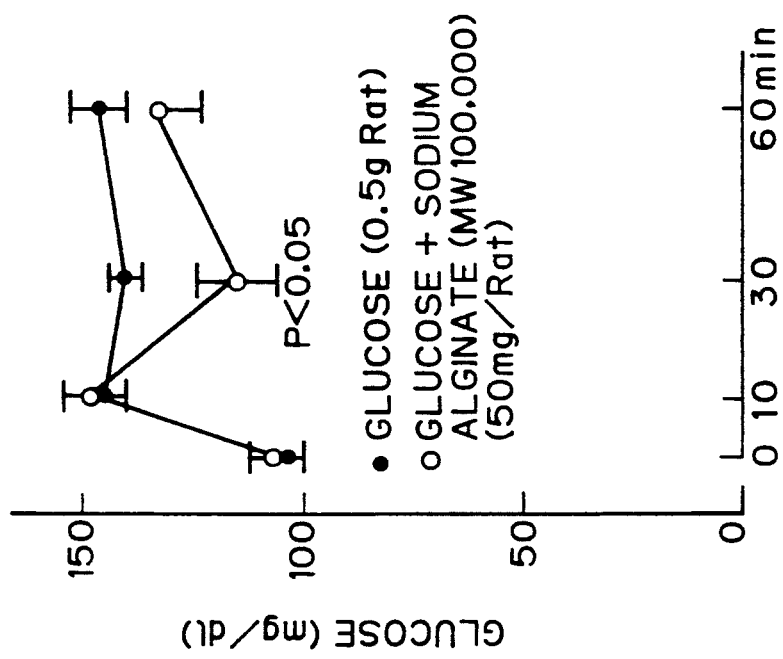

As shown in FIGS. 3(a) and 3(b), sodium alginate having an average molecular weight of 100,000 (AG-10) significantly prevented the blood glucose and insulin levels from rising 30 minutes after the glucose loading (P<0.05). This indicates that AG-10 may prevent the absorption of glucose through the small intestine.

Safety of Low Molecular Weight Algin

The following experiments illustrate that a low-molecular weight algin used in the invention is non-toxic like a conventional high-molecular weight algin.

Experiment 8

Acute Toxicity Test

To each of 5-week old SD rats (28 male and 15 female rats), a single dose of 5 g/kg of a low-molecular weight sodium alginate (average molecular weight: 50,000) was orally administered. The dose was about 25 times as much as that used in Experiment 7. Vehicle was given to the animals in a control group. After administration, each rat was observed for 2 weeks with respect to its general condition and survival or death with measurements of body weight and pathoanatomical observations, if necessary.

As is apparent from the results summarized below, no abnormalities were found.

(1) Observation of General Condition and Survival or Death

In all the male and female rats in the administered group, soft feces, sludgy feces, and soiling of pelage around the ani with excrements were found within 4 hours after administration. However, these manifestations disappeared next day to restore normal conditions in all the animals.

In a female rat in the control group, soft feces were observed about 3 and a half hours after administration, but these disappeared the next day.

Also in the control group, thinned pelage in the haunch were found in a female rat from the 1st to 6th day after administration, and scabs in the neck (later resulting in thinned pelage) were found in a male rat from the 11th day after administration. No further abnormalities in general condition were observed and none of the rats died.

(2) Change in Body Weight

All the male and female rats in the administered group showed a change in body weight similar to the control group.

(3) Pathoanatomical Observation

No abnormalities were found in either group.

Experiment 9

(Subacute Toxicity Test)

To each of 5-week old SD rats (60 male and 60 female rats), a low-molecular weight sodium alginate (average molecular weight: 50,000) was orally administered at a single daily dose of 1, 0.5, or 0.25 g/kg for 28 consecutive days. Vehicle was given to the animals in a control group. After administration, each rat was observed for 28 days with respect to its general condition and survival or death with measurements of body weight and pathoanatomical observations, necessary.

As is apparent from the results summarized below, no abnormalities were found.

(1) Observation of General Condition and Survival or Death

In the male and female rats in the group administered a dose of 1 g/kg, soft feces were occasionally found within 4 hours after administration but they disappeared next day.

Occasionally, thinned or fallen pelage in both the forelegs was occasionally found in all the groups including the control group, and scabs in the neck were found in the control group and the group administered a dose of 0.5 g/kg. No further abnormalities in general condition were observed and none of the rats died.

(2) Change in Body Weight

In each administered group, the change in body weight was similar to that in the control group.

(3) Pathoanatomical Observation

No significant abnormalities were found in any group.

Examples

Using low-molecular weight sodium alginates having different average molecular weights, the following beverage formulations for use as health foods were prepared by mixing the ingredients.

Example 1

100 g of aqueous 5.2% solution of sodium alginate (M.W.: 60,000)
5 g of sodium citrate
10 g of apple juice
5 g of honey

Example 2

200 g of aqueous 5.2% solution of sodium alginate (M.W.: 50,000)
5 g of sodium citrate
10 g of apple juice
5 g of honey

Example 3

200 g of aqueous 5.2% solution of sodium alginate (M.W.: 100,000)
5 g of sodium citrate
10 g of apple juice
5 g of honey

Example 4

200 g of aqueous 5.2% solution of sodium alginate (M.W.: 50,000)
5 g of sodium citrate
1 g of ginseng extract
5 g of royal jelly

Example 5

200 g of aqueous 5.2% solution of sodium alginate (M.W.: 100,000)
5 g of sodium citrate
10 g of extract of Houttuynia cordata
5 g of royal jelly

Example 6

200 g of aqueous 5.2% solution of sodium alginate (M.W.: 100,000)
5 g of sodium citrate
10 g of adlay extract
5 g of honey All the resulting beverages were easy to drink and had a good taste. Thus, the addition of a low-molecular weight algin which still functions as a dietary fiber to a beverage or food according to the present invention can provide a health food having a higher algin content than that prepared from a conventional high-molecular weight algin. Since the low-molecular weight algin can suppress an increase in blood glucose or insulin level in a glucose tolerance test, the algin-containing food according to the invention will be useful as a functional food for prevention of obesity and diabetes.

Although the present invention has been described with respect to preferred embodiments, it is to be understood that variations and modifications may be employed without departing from the concept of the invention as defined in the following claims.

What is claimed is:

1. A method for treating or preventing obesity, comprising orally administering to an individual in need of such treatment a therapeutically effective amount of an algin having a weight average molecular weight in the range of from 10,000 to 150,000 as determined by gel permeation chromatography.

2. The method of claim 1, wherein said algin is administered in the form of an aqueous solution thereof, said algin being present in said solution in an amount which results in said solution having a viscosity sufficiently low to permit ingestion by drinking.

3. A method for treating or preventing diabetes, comprising orally administering to an individual in need of such treatment, a therapeutically effective amount of an algin having a weight average molecular weight in the range of from 10,000 to 150,000 as determined by gel permeation chromatography.

4. The method of claim 3, wherein said algin is administered in the form of an aqueous solution thereof, said algin being present in said solution in an amount which results in said solution having a viscosity sufficiently low to permit ingestion by drinking.

* * * * *